(12) United States Patent
Faddi

(10) Patent No.: US 7,008,214 B2
(45) Date of Patent: Mar. 7, 2006

(54) DUMPLING MAKER

(76) Inventor: Ibolya Faddi, Semley Rd., Pittstown, NJ (US) 08867

( * ) Notice: Subject to any disclaimer, the term of this patent is extended or adjusted under 35 U.S.C. 154(b) by 186 days.

(21) Appl. No.: 10/650,738

(22) Filed: Aug. 29, 2003

(65) Prior Publication Data

US 2005/0069602 A1    Mar. 31, 2005

(51) Int. Cl.
*A21C 3/04*    (2006.01)
(52) U.S. Cl. .................. 425/382 R; 425/464; 426/503; 426/516; 99/353; 99/407; 99/410; 99/411; 99/450; 99/537; 210/464; 210/469; 210/470; 210/474
(58) Field of Classification Search .................. 99/353, 99/407, 410, 411, 450, 537; 426/503, 516; 425/464, 382 R; 210/464, 469, 470, 474
See application file for complete search history.

(56) References Cited

U.S. PATENT DOCUMENTS

| | | | | |
|---|---|---|---|---|
| 559,172 A | * | 4/1896 | Hall | 99/410 |
| 1,395,951 A | * | 11/1921 | Ferdon | 210/470 |
| 1,461,504 A | | 7/1923 | Tanzi | |
| 2,404,130 A | * | 7/1946 | Frank | 220/751 |
| 3,452,688 A | | 7/1969 | Spohn | |
| 4,452,581 A | * | 6/1984 | Panehal | 425/464 |
| 4,458,581 A | | 7/1984 | Paley et al. | |
| 4,739,698 A | * | 4/1988 | Allaire | 99/410 |
| 5,800,854 A | * | 9/1998 | Jaeger | 426/516 |
| 5,913,966 A | * | 6/1999 | Arnone et al. | 99/413 |
| 6,116,154 A | * | 9/2000 | Vaseloff | 99/483 |
| 6,443,053 B1 | * | 9/2002 | Rossi | 99/340 |

* cited by examiner

Primary Examiner—Joseph S. Del Sole

(57) ABSTRACT

A cooking utensil includes an all-in-one device that incorporates a partially perforated pan, circular in shape, with a permanent and continuous circumferential holder with one or more supports that provide stability and safety during the extrusion process of the soft batter. At the same time, this cooking utensil fits easily on top of commonly used cooking vessels regardless of lip configuration or vessel diameter. This cooking utensil also includes versions for removable type holders in kit form that can be used interchangeably with several pans with different hole sizes while providing multiple support and stability over commonly used cooking vessels.

18 Claims, 5 Drawing Sheets

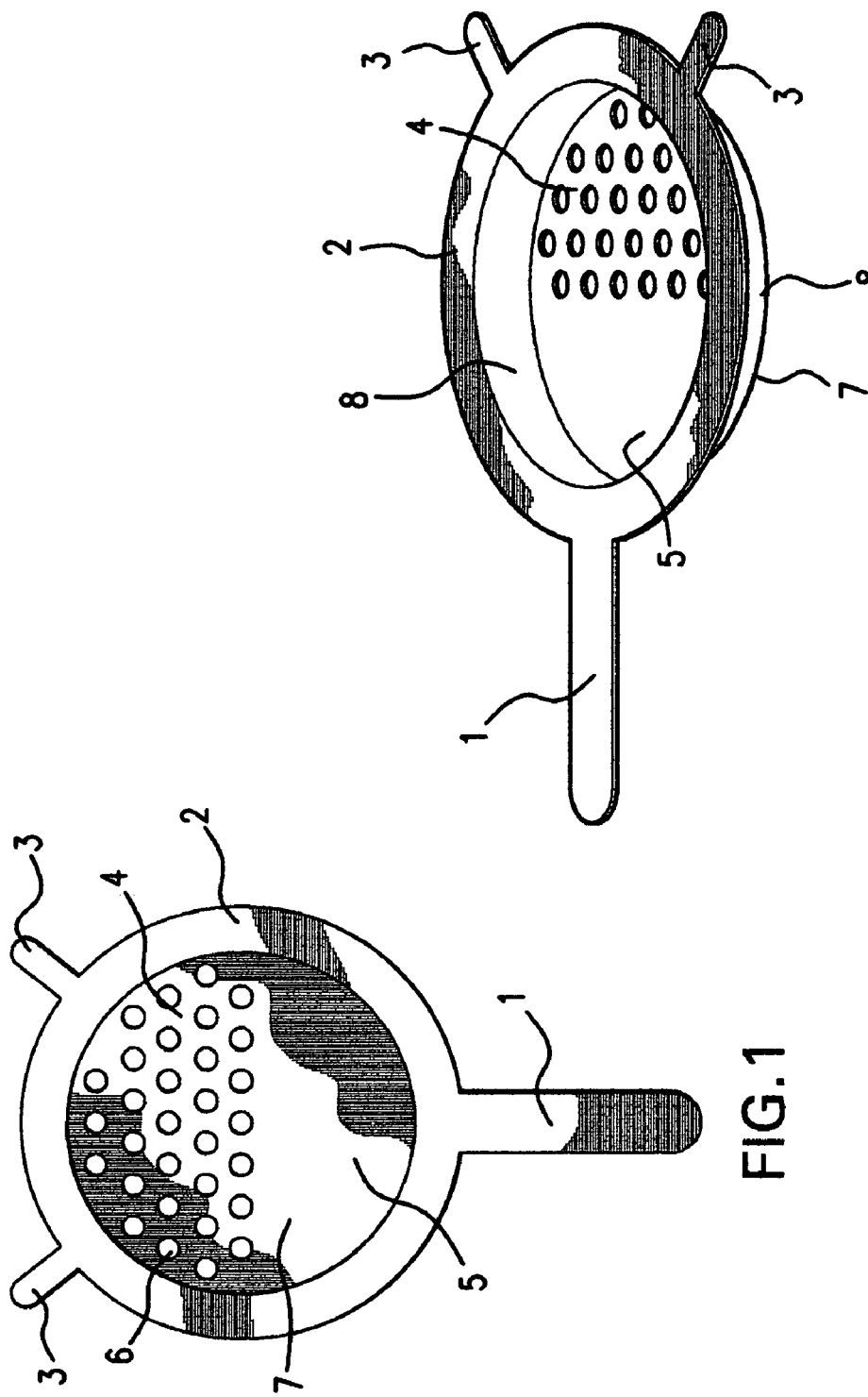

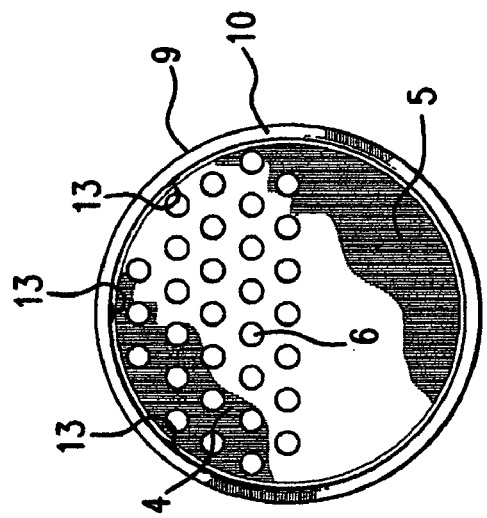
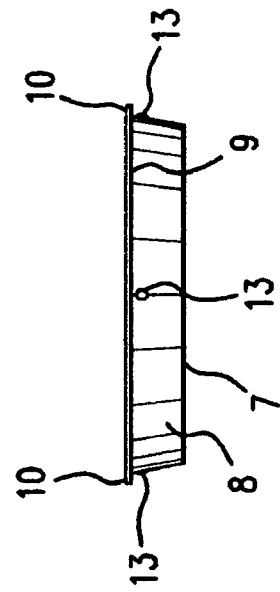
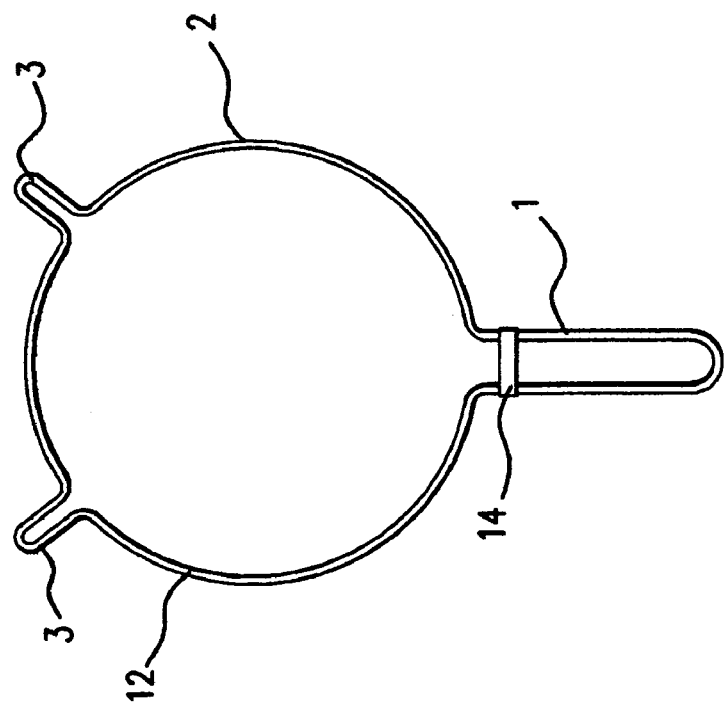

DUMPLING MAKER

BACKGROUND OF THE INVENTION

1. Field of Invention

The present invention relates to food preparation devices. More particularly, the present invention relates to machines and apparatuses for preparing cooked foods, especially dumplings.

2. Discussion of the Background

People have been making dumplings for years. In a typical process, the cook uses various cooking utensils to extrude soft batter and the like into a pot of hot liquid, such as water or oil. These conventional utensils generally include a partially perforated (e.g., holes distributed over half a surface) or totally perforated (holes distributed over an entire surface) pan or a die through which a cook extrudes pre-prepared through the perforated plates, or surfaces, by applying a force to the batter, perhaps using a tool to assist in applying the force.

For example, U.S. Pat. No. 3,452,688 describes a dough extruding apparatus having an extrusion die mounted directly above a cooking vessel. The dough is extruded through the die by a force exerted on a pressure plate by manually pushing handle downwardly.

U.S. Pat. No. 1,461,504 describes a macaroni die that includes a plurality of plates secured together. The die is adapted for producing food products with irregular shapes.

U.S. Pat. No. 4,452,581 describes a cooking utensil having a pan with a food holding area and an array of holes making up the extrusion area for batter that is pressed therethrough. The pan is removably mounted on a cooking vessel by way of a single removable clamp that holds the pan in place during the batter extrusion process.

The present inventor identified a number of limitations with this convention device. For example, the use of a single clamp provides insufficient stability for a pan, thus creating a safety hazard because the device is used over boiling water. Furthermore, the device cannot be universally used over a wide variety of cooking vessels because the clamp is not adapted for use with cooking vessels having, for example, a curved lip. The utility of this device is also limited because the single clamp mounting arrangement of the pan on top of cooking vessel leaves excessive exposed surface area of the boiling water, and thus creating a steam scolding hazard for the cook.

The present inventor also recognized that this conventional device offers no provision for a handle, making the pan awkward to manage. Lastly, certain batter mixtures are very sticky and can easily lift up the whole cooking utensil and force it to fall into the boiling water, thus creating another safety hazard.

BRIEF SUMMARY OF THE INVENTION

An object of the present invention is to overcome the above-identified and other deficiencies with conventional cooking apparatuses.

As recognized by the present inventor, it would be advantageous to provide a one-piece cooking utensil that would have a radially-extended, continuous circumferential rim with one or more extended supports and a handle over the cooking vessel to provide safety and speed to facilitate dumpling making.

It would also be advantageous to provide a two-piece cooking utensil having a detachable holder and a partially or completely perforated pan that can be universally placed on top of any commonly used cooking vessel regardless of lip configurations that are commonly available.

It would also be advantageous if the cooking utensil could be supported at multiple points on top of the cooking vessel to provide stability and safety for the utensil during operation.

It would also be advantageous to cover or significantly reduce the exposed surface area of the boiling water around the cooking utensil to protect the cook from steam scolding during the extrusion process.

It would also be advantageous to have a handle for the holding device to provide additional support, quick and safe removal of the cooking utensil from the cooking vessel.

It would also be advantageous to provide a holding device for the perforated pan that would be removable and easily adaptable to different size perforated pans and at the same time provide a handle and one or more supports for safety and speed to the dumpling making process.

It would also be advantageous to provide a removable holding device that would tightly snap around the perforated pan that would prevent the pan from coming loose during dumpling making.

It would also be advantageous to provide a two piece cooking utensil having a detachable holder and a partially or completely perforated pan that can be universally placed on top of any commonly used cooking vessel regardless of lip configuration.

The present invention addresses these, and other, needs by providing a continuous circumferential pan holder for the partially perforated pan, preferably circular but it can be of rectangular or other geometric shape, on top of the cooking vessel and thereby provide total support all the way around the pan, stability and safety during the extrusion process.

Another object is to provide a universal pan holder that can be used on all common cooking vessels typically ranging from 7.5 inches to 19 inches in diameter, or any pot diameter by matching an appropriate size holder for the pan.

Another object is to provide a pan holder with one or more support points that can be easily attached to other perforated pans having different hole sizes and patterns to facilitate smaller or larger dumpling production.

Another object is to provide a handle for the pan holder outside of the cooking vessel surface area to prevent the homemaker from steam burns and to provide additional stability and mobility during dumpling making. In addition, the handle would provide a way to lift the perforated pan from the cooking vessel and help with the occasional stirring of the dumplings in the boiling water or soup.

In a first embodiment, an all-in-one piece, or integrated, stamped or molded cooking utensil includes a partially perforated pan having a narrow rim, radially extended outward continuously and circumferentially. The device also has one or more supports and a handle that protrudes beyond the outermost diameter of the rim. The resultant cooking utensil is a one piece stamped (forged, molded or cast) assembly, whereby the extended rim and outer supports are flat and become an integral part of the perforated pan. The cooking utensil is made to conveniently rest on top of most common cooking vessels.

A second embodiment provides a universal and removable-type one piece stamped, forged or molded flat holder, of sufficient structural strength to hold, a perforated pan. This holder, has a void in its center (or other interior portion) to accommodate the perforated pan, has a continuous and circumferential wide rim and has one or more supports and a handle as an integral part of the assembly. This universal pan holder can be made from sheet metal such as aluminum or stainless steel, heat resistant plastic or any other suitable food-grade material. A flat holder fits directly underneath the pan rim and provides continuous circumferential support as well as one or more extended support points over a cooking vessel similar to all-in-one utensil described above. This embodiment of the invention is suitable to be packaged as part of a kit to facilitate the interchangeability of several pans with different perforated hole sizes, shapes and layouts to accommodate a partially perforated pan having a refill area and an extrusion area.

A third embodiment of the invention provides a separate removable and universal "wire-type" pan holder made from round stainless stock and bent into an appropriate pattern to provide one or more support points. This embodiment may also be packaged as a part of a kit to facilitate the interchangeability of several pans with different hole sizes, shapes and layouts having a refill area and an extrusion area. In conjunction with the use of this "wire-type" holder, the vertical sides of the perforated pan are fitted with multiple detents whereby the holder is slipped over them and is locked between the detents and the rim of the pan. The resultant holder assembly provides multiple support points with handle to operate cooking utensil safely and quickly.

A fourth embodiment provides a separate removable and universal "vertical metal band-type" pan holder made from flat stainless steel stock, preferably 1/16 in×3/8 in, bent vertically into an appropriate pattern to provide one or more support points. This embodiment may also be packaged as part of a kit to facilitate the interchangeability of several pans with different hole sizes and layouts having a refill area and an extrusion area.

BRIEF DESCRIPTION OF THE DRAWINGS

FIG. 1—Plan view of all-in-one cooking utensil—(Dumpling maker)
FIG. 2—Profile view of all-in-one cooking utensil
FIG. 3—Plan view of universal flat-type pan holder
FIG. 4—Plan view of circular partially perforated pan
FIG. 5—Side view of circular partially perforated pan
FIG. 6—Plan view of assembled cooking utensil with flat-type pan holder
FIG. 7—Side view of assembled cooking utensil with flat-type pan holder
FIG. 8—Plan view of wire/rod-type universal pan holder
FIG. 9—Plan view of partially perforated pan modified with detents
FIG. 10—Side view of partially perforated pan modified with detents
FIG. 11—Side view of assembled cooking utensil with wire/rod-type holder with detents
FIG. 12—Plan view of vertical metal band-type holder
FIG. 13—Side view of vertical metal band-type holder

DETAILED DESCRIPTION OF THE INVENTION

The present invention is an all-in-one piece cooking utensil comprising a pan with a partially perforated flat bottom 7, and vertical side 8. The pan has a narrow rim 2 that radially extends outward up to 6 inches continuously and circumferentially and one or more extended supports 3. The lengths of the supports 3 are configured to suit the cooking vessel diameter, and can either be of fixed length, or variable length. The variability may be accomplished with extension rods. The pan also includes a handle, 1, up to 7 inches in length, for example, that further protrudes passed the outermost diameter of the rim, as illustrated in FIG. 1.

The resultant cooking utensil is one piece stamped, cast or molded whereby the extended rim, 2, and outer supports, 3, is generally flat and becomes an integral part of the partially perforated pan. The outer supports extend between one to six inches from the outermost diameter of the circumferential support, (rim), 2, at 10:00 o'clock and 2:00 o'clock positions; however, the support locations can be at any point around the circumference. The new cooking utensil, FIG. 1, will conveniently rest on top of most common cooking vessels up to 19 inches in diameter.

Figure 4:
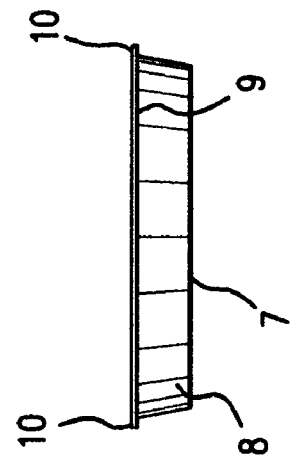
Figure 5:
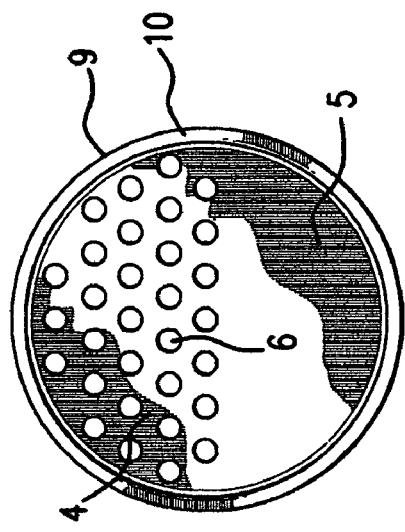
Figure 3:
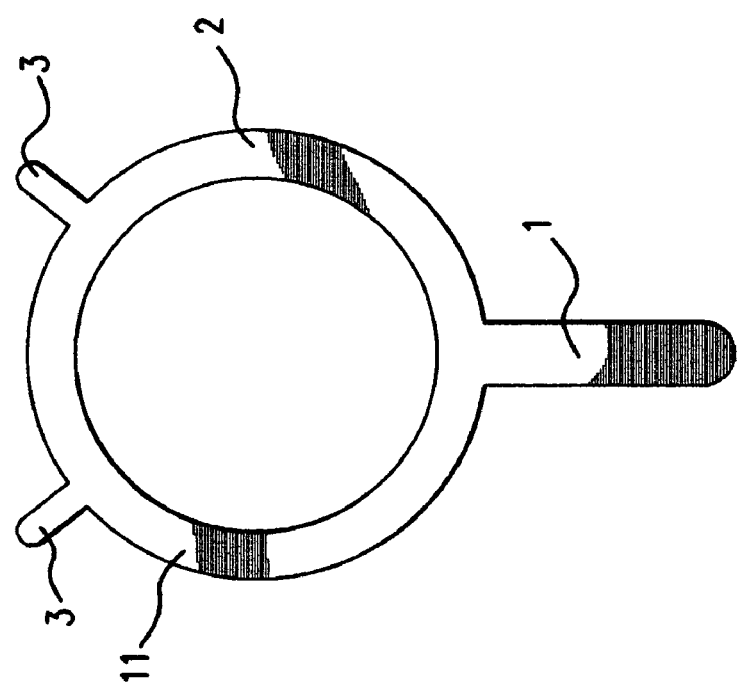
Figure 7:
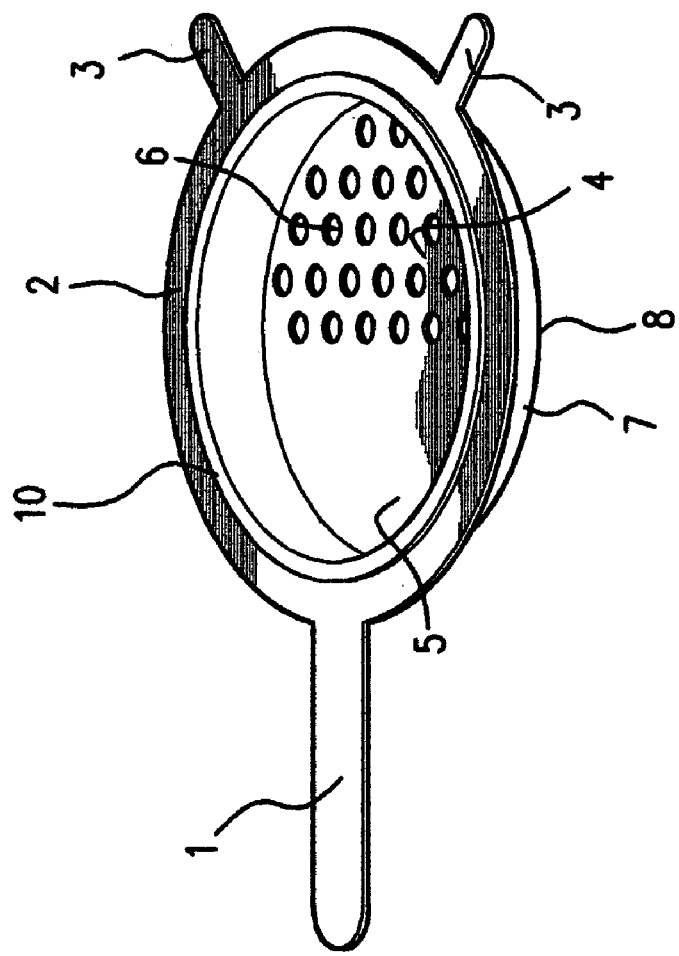
Figure 6:
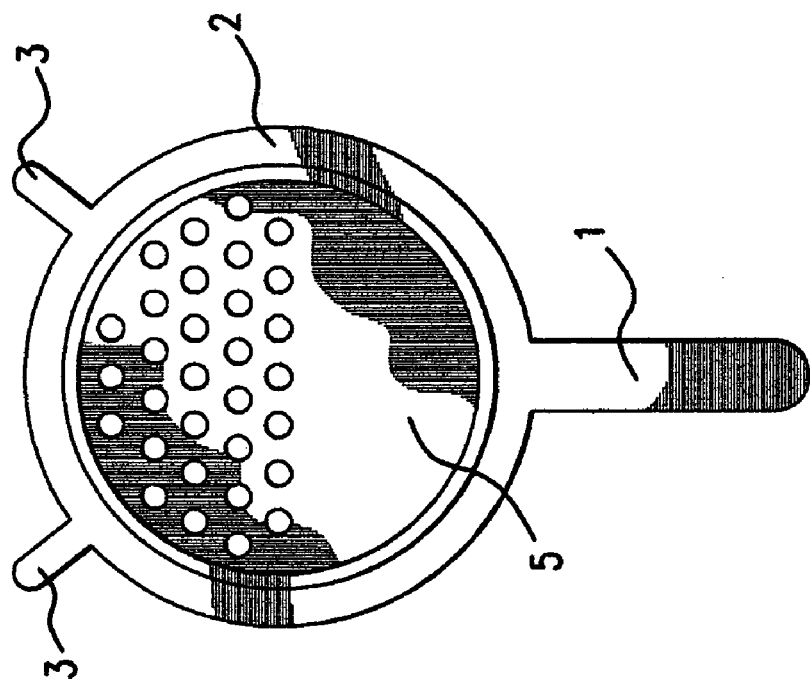
Figure 12:
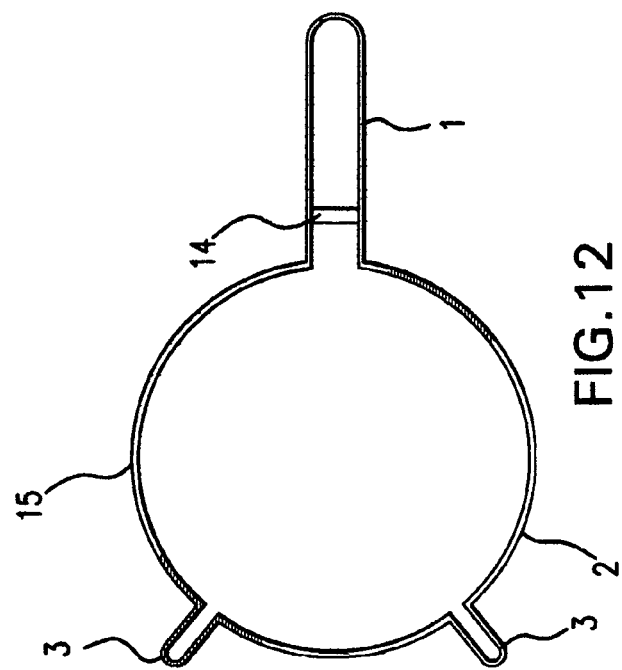
Figure 11:
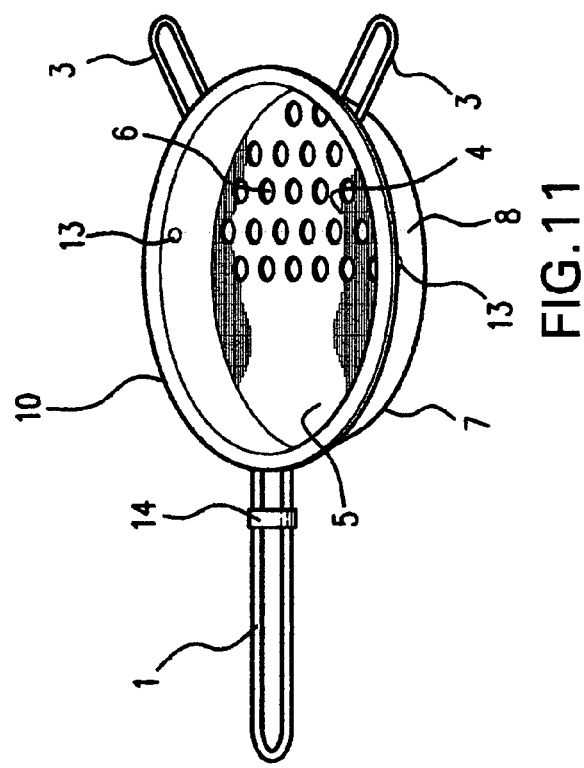

In a preferred embodiment a universal, removable type, flat holder is provided as a one piece, stamped or molded part, 11, with sufficient structural strength to hold a perforated pan, FIG. 5. This flat holder, 11, with its center cut out (or formed with a void in the center), 7.5 inches to 12 inches in diameter, to accommodate the perforated pan, would be continuous and circumferential with wide rim, 2, with extended supports, 3, and a handle, 1, as an integral part of the assembly. This universal pan holder is made from metal such as stainless steel (sheet metal) or aluminum, plastic or any other suitable food-grade material. This flat rim holder, 11, as illustrated in FIG. 3 fits directly underneath the pan rim and provides continuous circumferential support, 2, as well as one or more extended support points, 3, over the cooking vessel similar to the all-in-one utensil described above.

One attribute of this invention is that it can be arranged as a kit to facilitate the interchangeability of several pans with different hole sizes and layouts to accommodate a partially perforated pan having a refill area, 5, and an extrusion area, 4.

In a preferred embodiment a separate removable and universal "wire/rod-type" pan holder is made from round stainless steel stock, preferably 1/8 inch diameter, and bent into an appropriate pattern as illustrated in FIG. 8 to provide one our more support points. This embodiment of the invention is optionally packaged as a part of a kit to hold and facilitate the interchangeability of several pans with different diameter hole sizes and layouts having a refill area, 5, and an extrusion area, 4. In conjunction with the use of this "wire/rod-type" holder, the vertical side of the perforated pan, 9, is fitted with multiple detents, 13, whereby the wire holder is slipped over them and is locked between the detents, 13, and the rim of the pan, 10. The resultant holder assembly provides multiple extended support points with a handle to operate the cooking utensil safely and quickly. Typically, three detents, but it can be any number, are punched on the vertical side of the pan, 9, that protrude 1/16 inch from the side of the pan and located on its circumference 1/4 inch below the rim of the pan.

Figure 13:
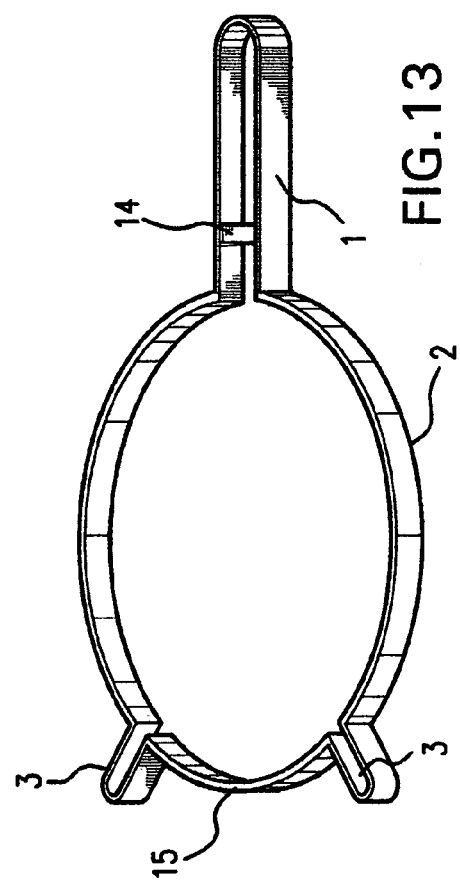

In a preferred embodiment a separate, removable and universal "vertical metal band-type" pan holder is provided. The holder is made from flat stainless steel stock, preferably 14 to 20 gauge in thickness by 1/4 inch to 1 inch in width, bent vertically into an appropriate pattern shown in FIG. 13 to provide one or more support points. The inner diameter of the bent holder would accommodate circular pans from 7.5 inches to 12 inches in diameter. This invention would be a part of a kit to facilitate the interchangeability of several pans with different hole sizes and layouts having a refill area, 5, and an extrusion area, 4.

Although the present invention has been particularly shown and described with reference to specific embodiments, it will be understood by those skilled in the art that various other changes in the form and details may be made therein without departing from the spirit and scope of the invention.

I claim:

1. An all-in-one cooking utensil comprising:
 a pan having
  a bottom,
  sides that extend from said bottom to a continuous circumferential rim, a width of said continuous circumferential rim being in an inclusive range of 1 inch through 6 inches,
  at least one extended support that extends radially from said rim, and
  a handle formed integrally with said rim, wherein
 said bottom includes two side-by-side sections including a first section having holes formed therethrough and a second section that is devoid of said holes and is configured to hold batter thereon as a staging area for being extruded through said holes in said first section, wherein said handle and said at least one extended support are configured to rest on a cooking pot so as to position an entirety of said bottom of said pan over an interior portion of said cooking pot.

2. The all-in-one cooking utensil of claim 1, wherein:
said holes including circular-shaped holes arranged in a pattern.

3. The all-in-one cooking utensil of claim 1, wherein:
said holes including non-round shaped holes.

4. The all-in-one cooking utensil of claim 1, wherein:
said handle is longer than said at least one extended support.

5. A cooking utensil comprising:
 a pan;
 a continuous circumferential pan holder having
  a frame having
   an inner diameter sized to accommodate the pan, the pan being a partially perforated pan having a diameter in an inclusive range of 7.5 inches through 12 inches in diameter, and
   an outer diameter up to 19 inches,
  a handle that extends from said outer diameter of said frame up to 7 inches in length; and
  at least one extension connected to said frame that extends, radially outward from said outer diameter by a distance and displaced along said outer diameter from said handle by another distance, wherein a bottom of said partially perforated pan includes two side-by-side sections including a first section having holes formed therethrough and a second section that is devoid of said holes and is configured to hold batter thereon as a staging area for being extruded through said holes in said first section, and when resting on a cooking pot said pan holder is configured to hold an entirety of the bottom of the pan over an interior portion of the cooking pot.

6. The cooking utensil of claim 5, wherein:
same frame having a substantially flat upper and lower surface.

7. The cooking utensil of claim 6, wherein:
said frame being formed of sheet metal.

8. The cooking utensil of claim 6, wherein:
said frame being formed of heat resistant plastic.

9. The cooking utensil of claim 6, wherein:
a difference between said inner diameter and said outer diameter being in an inclusive range of 1 inch to 3 inches, and said outer diameter being not more than 15 inches.

10. The cooking utensil of claim 5, wherein:
said frame being formed from a rod with a circular cross-section.

11. The cooking utensil of claim 10, wherein:
said handle being formed from said rod.

12. The cooking utensil of claim 11, wherein:
said at least one extension being formed from said rod.

13. The cooking utensil of claim 12, wherein:
said at least one extension includes
 a first extended support ear at a 10:00 o'clock position
 a second extended support ear at a 2:00 o'clock position, and
 said handle being at a 6:00 o'clock position.

14. The cooking utensil of claim 5, wherein:
said handle is longer than said at least one extension.

15. A cooking kit, comprising:
 a first substantially circular cooking pan having
  a substantially circular bottom having a diameter in an inclusive range of 7 through 12 inches;
  a frame configured to hold an entirety of said bottom of said cooking pan within an inner diameter of a cooking pot on which said frame is configured to be disposed;
  a side that extends from said bottom to a continuous circumferential lip that is configured to contact and be supported by the frame, said side includes a detent formed therein such that said frame is held in place between said lip and said detent when said pan is placed on said frame, and
  said bottom includes two side-by-side sections including a first section having holes formed therethrough and a second section that is devoid of said holes and is configured to hold batter thereon as a staging area for being extruded through said holes in said first section.

16. The kit of claim 15, further comprising:
a second pan including different shaped holes as said first pan.

17. The kit of claim 15, further comprising:
a second pan including a different pattern of holes than said first pan.

18. The kit of claim 15, further comprising:
a second pan including more holes than said holes in said first pan.

* * * * *